(12) United States Patent
Kunz

(10) Patent No.: US 7,303,813 B2
(45) Date of Patent: Dec. 4, 2007

(54) PROTECTIVE LAYER AGAINST WEAR BASED ON ARTIFICIAL RESIN, METHOD FOR THE PRODUCTION THEREOF AND USE OF THE SAME

(75) Inventor: Reiner Kunz, Laufenburg (DE)

(73) Assignee: Treibacher Schlefmittel GmbH (DE)

( * ) Notice: Subject to any disclaimer, the term of this patent is extended or adjusted under 35 U.S.C. 154(b) by 0 days.

(21) Appl. No.: 10/416,653

(22) PCT Filed: Nov. 30, 2001

(86) PCT No.: PCT/EP01/14028

§ 371 (c)(1),
(2), (4) Date: Oct. 20, 2003

(87) PCT Pub. No.: WO02/45955

PCT Pub. Date: Jun. 13, 2002

(65) Prior Publication Data

US 2004/0053038 A1    Mar. 18, 2004

(30) Foreign Application Priority Data

Dec. 8, 2000 (DE) .............................. 100 61 497

(51) Int. Cl.
  *B32B 5/16* (2006.01)
  *B32B 18/00* (2006.01)
  *B32B 29/00* (2006.01)
(52) U.S. Cl. .................. 428/323; 428/325; 428/537.5
(58) Field of Classification Search ................ 428/323, 428/325, 908.8
See application file for complete search history.

(56) References Cited

U.S. PATENT DOCUMENTS

| | | | | |
|---|---|---|---|---|
| 4,146,635 A | * | 3/1979 | Eigenmann | 442/68 |
| 4,880,689 A | * | 11/1989 | Park et al. | 428/143 |
| 5,141,799 A | * | 8/1992 | Mehta et al. | 428/207 |
| 6,218,001 B1 | * | 4/2001 | Chen et al. | 428/323 |

FOREIGN PATENT DOCUMENTS

| | | |
|---|---|---|
| JP | 8-511212 | 11/1996 |
| WO | WO-94/22678 | 10/1994 |

* cited by examiner

*Primary Examiner*—Sheeba Ahmed
(74) *Attorney, Agent, or Firm*—Connolly Bove Lodge & Hutz LLP

(57) ABSTRACT

The invention relates to a protective layer against wear based on artificial resin. Hard particles (1) having a hardness of at least 6 on the Mohs scale are embedded in said layer, as are compact, round, solid particle (2), which are essentially free of sharp edges and have a hardness of at least 5 on the Mohs scale. The grain size distribution of the round solid particles (2) begins at least with the smallest grain diameter of the hard particles (1) and reaches a maximum of five times the value of the largest hard particle diameter, the average grain diameter of the solid particles (2) being larger than the average grain diameter of the hard particles (1). The hard particles and round solid particles are admixed for producing a protective layer against wear and for providing wear-resistant surfaces.

19 Claims, 1 Drawing Sheet

Figure 1:
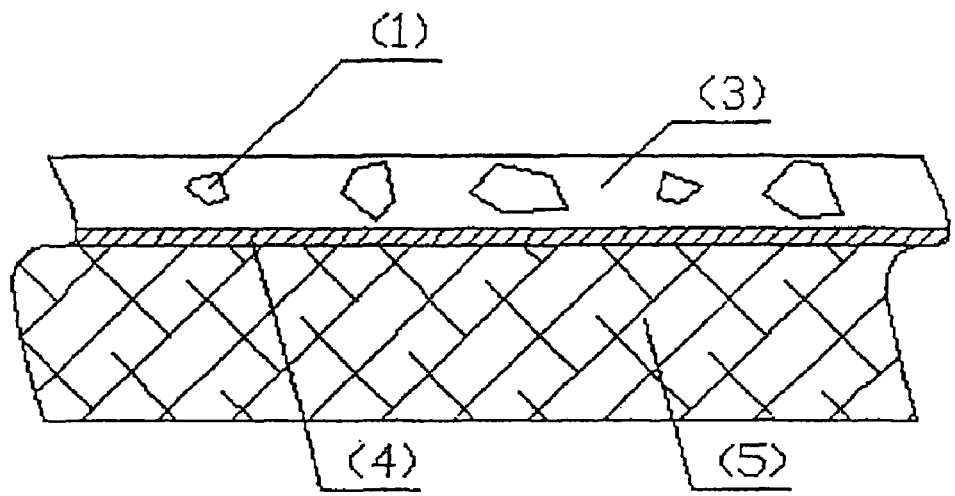
Figure 2:
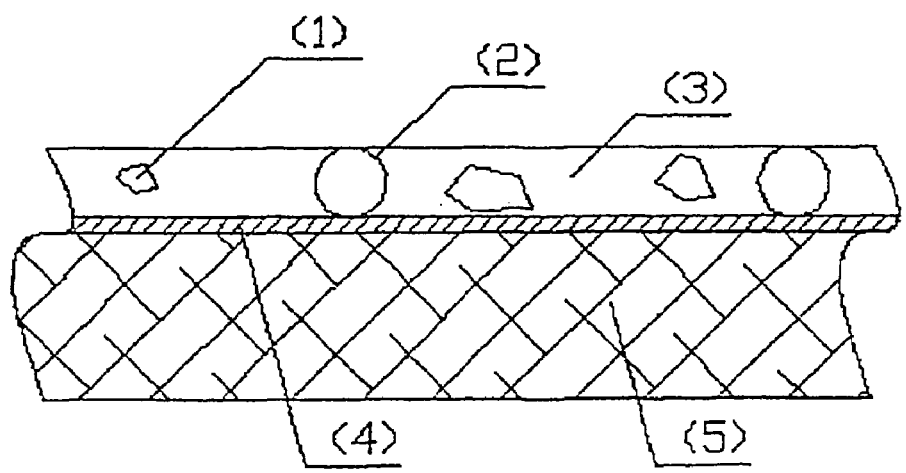

PROTECTIVE LAYER AGAINST WEAR BASED ON ARTIFICIAL RESIN, METHOD FOR THE PRODUCTION THEREOF AND USE OF THE SAME

Subject of the invention at hand is a protective layer on the basis of a synthetic resin with hard particles in accordance with the characterizing clause of claim 1. Furthermore, subject of the invention at hand is a method for its production as well as its utilization.

It is generally known that the surfaces of furniture pieces, floors, etc. can be provided with a decorative look by applying so-called laminates consisting of a decorative paper impregnated with a heat-hardenable synthetic resin. Primarily, the impregnation serves to reduce the sensitivity of the surface to mechanical, thermal and chemical wear and tear (e.g. abrasion, scratching, water, solvents, steam and solvent vapors).

The laminate itself frequently consists of three layers, a dyed or printed decorative paper, a superimposed transparent overlay paper and an underlying so-called core paper that serves as the carrier for the decorative paper and the overlay paper. All three papers have been impregnated with a heat-hardenable synthetic resin.

Phenol resins, epoxy resins, polyester resins, silicones, diallyl phthalates, aminoplasts, and many others more are suited as heat-hardenable synthetic resins for the production of laminates. Phenol formaldehyde resins are particularly well suited for the production of decorative layers. Melamine formaldehyde resin is used preferentially.

Since the surfaces of furniture and especially those of floors are frequently exposed to strong mechanical stress, it has been attempted again and again in the past to increase the wear resistance of the laminate through the embedding of hard-substance particles in the resin layer with which the uppermost paper (decorative paper) is impregnated.

U.S. Pat. No. 3,928,706, EP-A-0 519 242, U.S. Pat. No. 5,344,705, DE-C-195 08 797, DE-A-196 04 907 and WO 97/00172 may be named as examples of a great number of publications and patents that describe the corresponding methods for the production of wear-resistant decorative layers or, respectively, of the laminates. In all of these publications, particles on the basis of aluminum oxide are primarily named as suitable hard-substance particles for the production of wear-resistant decorative layers. The preferred range for the median grain size of those particles lies between 1 and 150 μm.

U.S. Pat. No. 3,928,706 describes the production of wear-resistant decorative layers that consist of a core paper, a decorative paper, an abrasion layer and an overlay paper. The abrasion layer consisting of a heat-hardenable synthetic resin, a non-water-soluble hard substance with a hardness of at least 7 on the Mohs scale finely distributed therein, and cellulose fibers finely distributed therein as well, is applied either on one of the surfaces of the decorative paper or of the overlay paper. All three papers are impregnated with a heat-hardenable synthetic resin and are worked into a uniform laminate in the usual manner by pressing them at temperatures of approximately 150° C. between highly polished press plates.

EP-A-196 04 907, describes protective layers against wear of particular clarity and a particular image which is achieved by providing the decorative paper with an abrasion layer containing a densification agent and a lubricant in addition to the silane-coated hard substances. Processing into the finished laminate occurs in the usual manner through pressing.

In DE-A-196 04 907 a method is described for obtaining a wear-resistant sheet in which the paper is coated directly during the production process, even prior to being dried, with a paste containing relatively coarse, wear-resistant particles as well as a binder. The average particle size of the hard substances lies between 10 and 100 μm. Silicon oxide, aluminum oxide, alundum, corundum, emery, spinel as well as various carbides are mentioned as hard-substance particles.

WO 97/00172 describes a method in which an overlay paper is coated on both sides with hard-substance particles for the production of wear-resistant laminates.

However, in all cases the production of wear-resistant laminate surfaces with hard-substance-filled overlay or decorative papers or, likewise, the direct coating with so-called hard-substance-filled "liquid overlays" leads to a major problem during the finishing process for the laminates because during non-continuous operation, the highly polished mirror surfaces of the press plates, and during continuous operation, the surfaces of the pressing bands are scratched through contact with the hard-substance particles, becoming unusable relatively quickly. Since the press plates and bands are relatively expensive, this wear and tear is quite an essential cost factor in the production of wear-resistant decorative layers.

In DE-C-195 08 797 it is tried to solve the wear-and-tear problem during the production process by providing the decorative paper with a wear-resistant layer without attaching to it a corresponding pre-manufactured overlay paper through pressing, adjusting the viscosity of the synthetic resin for the coating of the decorative paper in such a way that the finished decorative paper has a smooth, wear-resistant layer from which no hard-substance particles protrude any longer. However, high viscosity leads to air pockets and thereby to a lack of transparency of the layer. The problem of wear and tear on the pressing tools is not solved by that, either, since during the finishing process, under the usual pressing conditions, contact still occurs between the mirror surface of the press tool and the hard substance.

U.S. Pat. No. 5,344,704 describes a possibility for the reduction of the wear and tear on pressing tools by incorporating pre-hardened resin particles together with the hard-substance particles. However, if those pre-heated resin particles are to protect the pressing tools they must be larger than the hard-substance particles. But since the resin particles do pot possess sufficient hardness, the abrasion-resistance of the wear layer is greatly reduced thereby. On the other hand, if the pre-heated resin particles are of equal size or smaller than the hard-substance particles, the pressing tools can no longer be protected, or only insufficiently so. An additional disadvantage lies in the fact that the melamine resins that are commonly used reach the high transparency necessary for a high-quality decorative layer only through complete hardening under pressure. Therefore, mechanical resistance as well as the decorative effect seem to be a problem.

For that reason the invention was based on the task of providing a protective layer against wear during which the pressing tools are being treated gently and which therefore does not show the disadvantages of the state of the art as described above.

This task is solved by processing hard-substance particles with a hardness of at least 6 on the Mohs scale, together with cutting-edge-free, round solid particles with a hardness of at least 5 on the Mohs scale, in the synthetic-resin system for the respective protective layer against wear. The round solid particles have, so to speak, the effect of providing the necessary distance during the pressing process and, due to their round shape and their reduced hardness as compared with the hard substance, prevent scratching of the pressing plates to the greatest extent.

This measure may be employed without restriction for all methods for the production of protective layers against wear for which a pressing operation is provided during the finishing process.

In order to treat the mirror surfaces of the pressing tools particularly gently, it will be advantageous if the round solid particles are complete spheres made of glass that, depending on the area of application of the protective layer against wear, may be highly transparent (e.g. for decorative layers) or highly reflective (e.g. for safety markings). Smelting corundum is preferred for use as a solid. Of course it is also possible, depending on the requirements, to use any other solid substances for protective layers against wear known from literature in combination with the round solid particles according to the invention.

The average grain size for the solid substances as well as for the solid particles lies between 1 and 150 µm, preferably within the range between 1 and 100 µm, and particularly preferably within the range between 1 and 70 µm.

Commonly, however, solid particles such as, e.g. glass spheres, are not supplied mono-dispersed but rather with a certain grain size distribution. In order to assure an actual protection for the mirror surface of the pressing tools while maintaining the positive properties of the protective layer against wear, the grain size distribution should start at least with the smallest grain diameter of the hard substances and maximally end at the 5-fold value of the largest grain diameter of the hard substance particles, and the median grain diameter of the solid particles should be larger than the mean grain diameter of the hard substance particles. It proved to be particularly favorable if the grain distribution of the solid substance particles lies within the range of a 1-fold to 5-fold value of the largest grain diameter of the hard substance particles. An ideal case is reached if the solid substance particles are distributed in mono-dispersed form and are of a 1.2-fold value of the largest grain diameter of the solid substance particles.

Depending on the desired effect, the share of solid substance particles may vary within a wide range of 0.1 to 99.9 volume percent relative to the overall volume of particles (hard substance particles+round solid substance particles). Good wear resistance combined with clearly reduced wear and tear on the pressing tools can be found in a range between 5 and 40 volume percent relative to the overall volume of particles. Particularly favorable conditions exist in a range between 10 and 30 volume percent relative to the overall volume of particles.

Production of the protective layer against wear as per the invention occurs in accordance with the known state-of-the-art methods for the production of protective layers against wear. Thus, protective layers against wear can be obtained by applying a suspension of synthetic resin, hard-substance particles and round solid-substance particles in accordance with the invention. An additional possibility consists of soaking an overlay paper filled with hard substances and round solid-substance particles with synthetic resin and subsequently pressing it.

Typical uses for the protective layer against wear in accordance with the invention are wear-resistant plastic surfaces, laminate floors, working slabs, and the like. A special version of the invention concerns laminate floors or floor segments with reflecting surfaces as safety markings.

Below, the invention is explained in detail by way of Illustrations 1 and 2, with Illustration 1 showing a state-of-the-art protective layer against wear with imbedded hard substances and Illustration 2 showing the protective layer against wear in accordance with the invention with imbedded hard substances and round solid-substance particles.

List of reference symbols used in the illustrations:
1 hard-substance particle
2 round solid-substance particle
3 resin layer
4 decorative paper
5 medium dense fiber plate (MDF)

In the following, the invention is explained in detail by way of examples; this does not constitute any limitation thereto.

EXAMPLES

An MDF (medium dense fiber) plate was coated according to the state of the art with paper soaked with a melamine formaldehyde resin and dried at 120° C.

In the final step of the process, a protective layer against wear was created on this MDF plate pre-coated with decorative paper as follows:

Comparative Example 1

A suspension consisting of melamine formaldehyde resin and hard-substance particles was applied and dried at 120° C. Edelkorund Weiß (Alodur ZWSK, with a hardness of 9 on the Mohs scale, firm of Treibacher Schleifmittel AG) in F240 grain size (according to FEPA) was used as hard-substance particle. The grain size distribution of the Edelkorund F240 measured by way of the sedimentation method according to FEPA standard amounted to: 3%=66 µm, 50%=45 µm, and 94%=31 µm.

The share of Edelkorund ZWSK F240 in the newly created protective layer against wear amounted to approximately 10 g/m$^2$.

Example 2

A suspension consisting of melamine formaldehyde resin, hard-substance particles and round solid-substance particles was applied and dried at 120° C. Edelkorund Weiß as per comparative example 1 was used as hard-substance particle, together with the round solid-substance particles (radiant glass beads from the firm of Swaco Vestglas) in the following mixing ratio and grain size relation:

75 volume percent of Edelkorund WSK F240 (according to comparative example 1) and 25 volume percent radiant glass beads (firm of Swarco Vestglas, grain size 80 to 100 µm).

The glass beads of a defined grain size of 80 to 100 µm were produced beforehand by means of sifting.

Technical data of the radiant glass beads: hardened, lead-free sodium hydrogen carbonate glass, with a hardness of 6-7 on the Mohs scale, with a hardness of 46 on the Rockwell scale, specific gravity approximately 2.5 g/cm$^3$, piled density approximately 1.5 kg/l.

The share of the Edelkorund and glass bead mixture in the newly created protective layer against wear amounted to approximately 10 g/m$^2$ as in Example 1.

Example 3

The process proceeded analogously to Example 2. However, prior to its application, the mixture of Edelkorund grain F240 and 80 to 100 μm glass beads was coated with a polydimethyl siloxan/oil emulsion (firm of Bayer, Baysilone oil emulsion H) as follows:

12 ml of Emulsion H were mixed with 8 ml of desalinated water and then added to 1 kg of a mixture of Edelkorund and glass beads (75:25) and carefully mixed. This mixture was subsequently dried in a drying cabinet at 200° C. and then cooled to room temperature.

Determination of the Press Plate Wear and Tear

The decorative MDF plates produced and provided with a protective layer against wear in accordance with Comparative Example 1, Example 2 and Example 3 were pressed at a temperature of 150° C. for a final hardening and to obtain a high transparency. The pressing power amounted to 14 bars, the pressing time to approximately 10 seconds. For each pressing operation, one unused high-gloss metal pressing plate (mirror surface) was used. We determined the number of pressings that was possible up to the point when the pressing plate no longer produced any high-gloss, flawless MDF surfaces due to increased wear and tear (scratches, craters, tarnishing).

The number of pressings obtained is shown in the following compilation:

TABLE 1 press plate wear and tear

| MDF Plate | Number of pressings |
|---|---|
| Comparative Example 1: | approximately 3,200 |
| Example 2: | approximately 4,700 |
| Example 3: | approximately 4,900 |

Example 4

We proceeded as in Example 2. However, the mixture of Edelkorund and glass beads was produced from 30 volume percent of Edelkorund and 70 volume percent of glass beads, however using reflecting glass spheres (type: Swarcolux, approximately 100 microns, firm of Swarco Vestglas) in lieu of the transparent radiant glass beads.

As expected, abrasion resistance of the surface was reduced in this example; however, an increase in the degree of reflection of the surface was noted.

The invention claimed is:

1. A coating comprising embedded hard solid particles with a Mohs hardness of at least 6, and solid spherical particles substantially without cutting edges and with a Mohs hardness of at least 5, wherein the particle size distribution of the solid spherical particles extends from the smallest particle diameter of the hard particles to less than five times the largest particle diameter of the hard particles, and the average particle diameter of the solid spherical particles is greater than the average particle diameter of the hard particles.

2. The coating according to claim 1 wherein the particle size distribution of the solid spherical particles starts within the range between lowest and largest particle diameter of the hard particles and ends about 1.5 times of the largest particle diameter of the hard particles.

3. The coating according to claim 1 wherein the solid spherical particles are monodisperse, having a median diameter about 1.2 times the largest particle diameter of the hard particles.

4. The coating according to claim 1, wherein the solid spherical particles comprise transparent glass spheres, beads or a mixture thereof.

5. Method for the production of a coating according to claim 1 comprising applying a homogenous coating composition comprising the hard particles and the solid spherical particles in a synthetic resin to a substrate.

6. The method according to claim 5 wherein the substrate is an overlay paper that is soaked with the coating composition and subsequently pressed onto a surface.

7. The coating according to claim 1 wherein the volume share of the solid spherical particles is from 5 to 40 volume percent relative to the total volume percent of hard particles and solid spherical particles.

8. The coating according to claim 7 wherein the amount of the solid spherical particles is from 10 to 30 volume percent relative to the total volume percent of hard particles and solid spherical particles.

9. Method of protecting surfaces, floors, slabs, transform plates by forming the coating according to claim 1.

10. A protected article comprising the coating of claim 1 and further comprising a reflective surface as a safety marker.

11. The coating according to claim 1 wherein the solid particles are radiant glass beads and the solid particles comprise from 40 to 70 volume percent relative to the total volume percent of particles in the coating.

12. A coating composition comprising:
hard particles with a Mohs hardness of at least 6;
solid particles with a Mohs hardness of at least 5, wherein the median particle size of the solid particles is greater than the median particle size of the hard particles; and
a polymeric resin.

13. The composition according to claim 12 wherein the solid particles are spherical particles with essentially no cutting edges.

14. The composition according to claim 12 wherein the solid particles are glass spheres or glass beads.

15. The composition according to claim 12 comprising from 5 to 40 volume percent of the solid particles relative to the total volume percent of particles in the polymeric resin.

16. The composition according to claim 12 wherein the solid particles have a median diameter from about 1.2 to 1.36 times the largest particle diameter of the hard particles.

17. The composition according to claim 12 wherein the solid particles have a median diameter of about 1.2 times the largest particle diameter of the hard particles.

18. The composition according to claim 12 wherein the solid particles are radiant glass beads and the solid particles comprise from 40 to 70 volume percent relative to the total volume percent of particles.

19. An article comprising a cured coating composition of claim 18 wherein the coating provides a reflective surface on the article, and the article functions as a safety marker.

* * * * *

UNITED STATES PATENT AND TRADEMARK OFFICE
CERTIFICATE OF CORRECTION

| | | |
|---|---|---|
| PATENT NO. | : 7,303,813 B2 | Page 1 of 1 |
| APPLICATION NO. | : 10/416653 | |
| DATED | : December 4, 2007 | |
| INVENTOR(S) | : Reiner Kunz | |

It is certified that error appears in the above-identified patent and that said Letters Patent is hereby corrected as shown below:

On the Title Page:

In the References Cited section under FOREIGN PATENT DOCUMENTS, please insert -- JP 2000-006325 1/2000 --, -- JP 10-180972 12/1996 --.

Signed and Sealed this

Twentieth Day of May, 2008

JON W. DUDAS
*Director of the United States Patent and Trademark Office*